United States Patent [19]

Okada

[11] Patent Number: 4,813,682
[45] Date of Patent: Mar. 21, 1989

[54] VIDEO TARGET CONTROL AND SENSING CIRCUIT FOR PHOTOSENSITIVE GUN

[75] Inventor: Satoru Okada, Osaka, Japan

[73] Assignee: Nintendo Co., Ltd., Kyoto, Japan

[21] Appl. No.: 69,801

[22] Filed: Jun. 10, 1987

Related U.S. Application Data

[63] Continuation of Ser. No. 764,211, Aug. 9, 1985, abandoned.

[51] Int. Cl.⁴ .............................................. A63F 9/22
[52] U.S. Cl. .................................... 273/312; 273/313; 273/DIG. 28; 434/20; 434/22; 340/708; 382/59
[58] Field of Search .............................. 340/708, 707; 273/310–313, DIG. 28, 1 E, 85 G; 434/307, 323, 327, 20, 21, 22, 43; 235/471; 382/10, 59

[56] References Cited

U.S. PATENT DOCUMENTS 4,243,972 1/1981 Toussaint ............................ 340/707
4,329,684 5/1982 Monteath et al. .................. 340/707
4,395,045 7/1983 Baer .................................... 273/312

OTHER PUBLICATIONS

Atari, Inc., *Outlaw–Operation, Maintenance, and Service Manual*, 1976.
Atari, Inc., *Qwak–Service Information (PCB Logic)*.
Atari, Inc., *Qwak–Operation & Maintenance Manual*, 1974.

*Primary Examiner*—Maryann Lastova
*Attorney, Agent, or Firm*—Larry A. Jackson

[57] ABSTRACT

A television game apparatus according to this invention reads white picture data from a program ROM (6) to transfer it to a video RAM (8) and displays, on a television monitor (11), the white picture data, together with target or other data read from a character ROM (9). When a pistol (4) is leveled at a target on the screen of the television monitor (11) and the trigger is pulled, a switch (44) is closed to produce a trigger signal, on the basis of which black picture data is read from the program ROM (6) and displayed on the television monitor (11). Immediately after the black picture was displayed, the white picture is displayed in the next frame in the position where the target was displayed just before and/or around the periphery thereof. The light from this white picture is detected by a phototransistor (41), whose detection signal, when extracted by a filter (45, 46), is used as a detection signal from the target. Thus, there is no danger of mistaking the light from an illuminator for the light from the target.

8 Claims, 7 Drawing Sheets

VIDEO TARGET CONTROL AND SENSING CIRCUIT FOR PHOTOSENSITIVE GUN

This is a continuation application based in prior copending application Ser. No. 764,211 filed Aug. 9, 1985 for video target control and sensing circuit for photosensitive gun, now abandoned.

BACKGROUND OF THE INVENTION

1. Field of the Invention

This invention relates to a television game apparatus. More particularly, it relates to a television game apparatus adapted to be enjoyed by a player who levels a gun at a target displayed on the screen of a television monitor or CRT display and pulls the trigger, his score being increased when he succeeds in hitting or shooting down the target.

2. Description of the Prior Art

There has been known a television game apparatus adapted to be enjoyed by a player who levels a pistol at a target displayed on a television monitor and pulls the trigger, his score being increased when he succeeds in hitting or shooting down the target. In such television game apparatus, when the trigger on the pistol is pulled, a trigger signal is produced and the light from the target on the screen of the television monitor is detected by a photoelectric element built in the pistol.

In such television game apparatus, however, even if the trigger is pulled while leveling the pistol not at the target on the television monitor but at such an illuminator at a fluorescent lamp, there is a risk of the photoelectric element receiving the light from the illuminator and thereby producing a false detection signal.

Thus, in the past, to prevent the score from being increased by a detection signal based on the light from an illuminator, it has been common practice to provide a filter which allows passage of only a detection signal based on the light from the target displayed on the television monitor screen. This makes it possible to detect only the detection signal based on the light from the television monitor screen, and on the basis of this detection signal the score is increased. However, in spite of such measures taken, some illuminators emit light which has a wavelength close to that of the light from the television screen; thus, the mere provision of the said filter has not been sufficient to eliminate the drawback.

SUMMARY OF THE INVENTION

Accordingly, a primary object of this invention is to provide a television game apparatus adapted to obtain only a detection signal based on the light from a target on a television monitor screen and increase the score by said detection signal.

In brief, the invention resides in producing a trigger signal in response to a manual operation, displaying a black picture on a television monitor screen for a predetermined short period of time in response to said trigger signal, displaying a white picture as a mock target in a position where a target was displayed just before or around the periphery thereof upon the lapse of said time, detecting the light from the white picture upon the lapse of the black picture display period after the trigger signal has been produced, extracting the signal which is related to the television synchronizing signal from among the detection signals, and using said signal as a detection signal from the target.

Therefore, according to this invention, the light from the white picture is detected upon change from black to white picture and a signal produced through a filter from the detection signal is used as a detection signal from the target. As a result, it is possible to eliminate the risk of detecting the light from an illuminator in mistaken for the light from the target.

In a preferred embodiment of this invention, data corresponding to each of the different screen regions on a television monitor screen is stored, and each time a detection signal from the target is extracted, the data corresponding to the associated screen region is read and a white picture is displayed in the corresponding screen region based on the data.

Therefore, according to a preferred embodiment of the invention, a plurality of targets and background pictures can be simultaneously displayed in screen regions in the same frame and the light from a white picture displayed in each screen region can be detected.

Further, in a preferred embodiment of this invention, by changing the black or white picture within the vertical blanking period of the television synchronizing signal, it is possible to prevent noise produced during changing from appearing on the television monitor screen.

These object and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
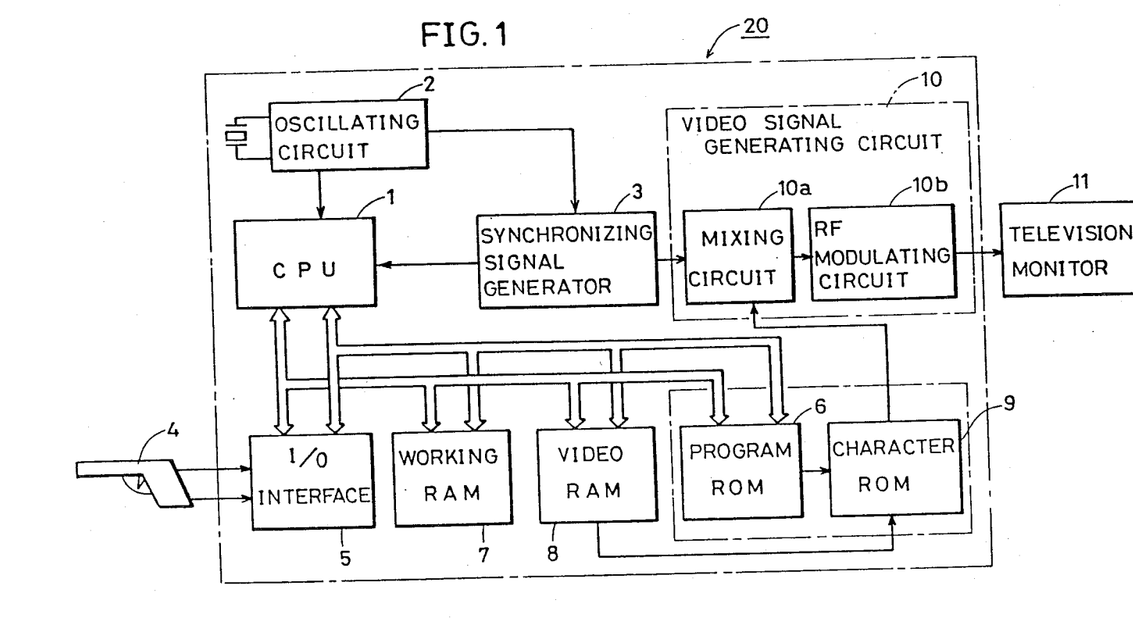
FIG. 1 is a schematic block diagram of an embodiment of this invention.
Figure 2:
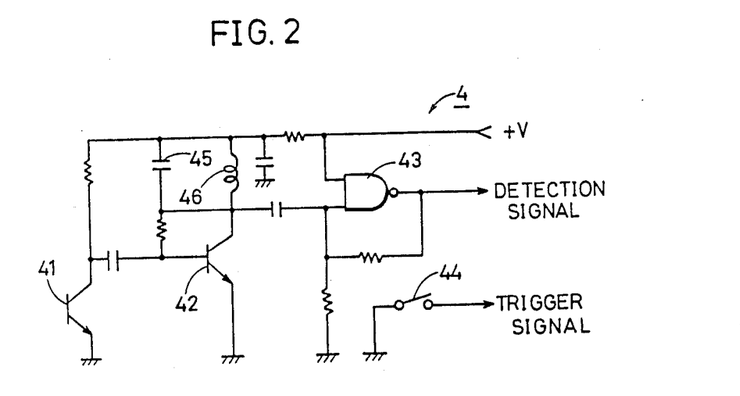
FIG. 2 is an electric circuit diagram of a light receiving circuit included in a pistol shown in FIG. 1.
Figure 3:
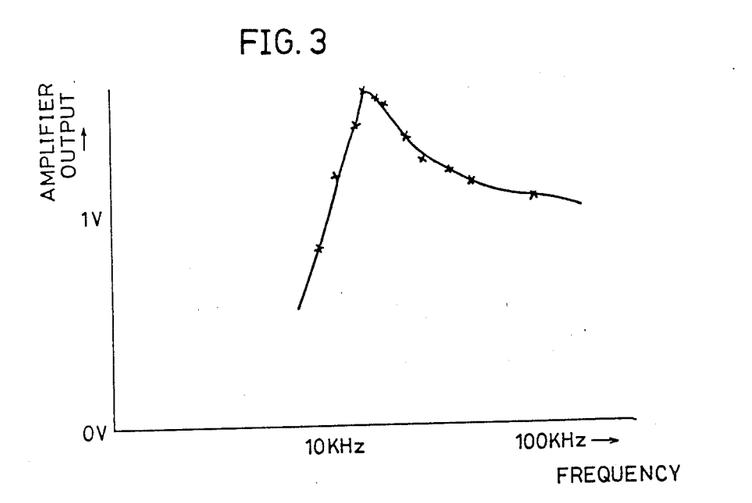
FIG. 3 is a graph showing the frequency characteristic of the light receiving circuit shown in FIG. 2.
Figure 4:
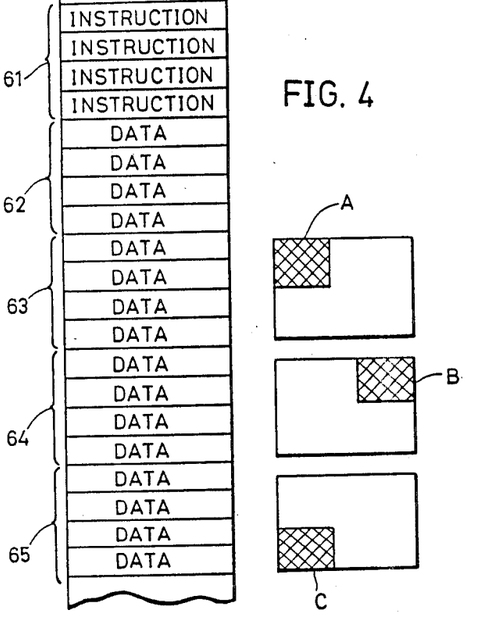
FIG. 4 is a diagram showing an example of a program stored in a program ROM shown in FIG. 1.
Figure 5:
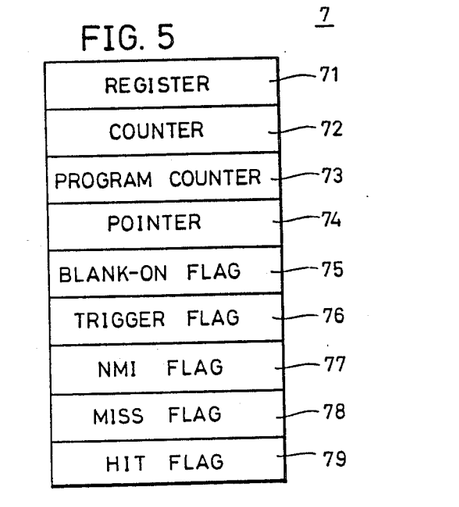
FIG. 5 is a diagram showing an example of the contents stored in a working RAM shown in FIG. 1.

FIG. 1 is a schematic block diagram of an embodiment of this invention; FIG. 2 is an electric circuit diagram of a light receiving circuit included in a pistol; FIG. 3 is a graph showing the frequency characteristic of the light receiving circuit shown in FIG. 2; FIG. 4 is a diagram showing an example of a program stored in a program ROM shown in FIG. 1; and FIG. 5 is a diagram showing the contents stored in a working RAM shown in FIG. 1.

First, referring to FIGS. 1 through 5, the arrangement of an embodiment of this invention will be described. Referring to FIG. 1, housed in a main body 20 in the form of a box are a CPU 1, an oscillating circuit 2, a synchronizing signal generator 3, an I/O interface 5, a program ROM, a working RAM 7, a video RAM 8, a character ROM 9, and a video signal generating circuit 10. Connected to the main body 20 are a pistol 4 and a television monitor 11. More preferably, particularly in the case where this invention is applied to a home television game apparatus using a home television set as a monitor, the program ROM 6 and character ROM 9 are housed in a single ROM cartridge, which is then removably installed in the main body 20. With this arrangement, simply by exchanging the ROM cartridge, the main body 20 can be used for a plurality of games.

The oscillating circuit 2 associated with the CPU 1 serves to generate timing signals in the CPU 1 and horizontal and vertical synchronizing signals from the synchronizing signal generator 3. Thus, the synchronizing signal generator 3 receives the oscillation output from the oscillating circuit 2 and generates horizontal and vertical signals, which are then imparted to the CPU 1 and video signal generating circuit 10. The video signal generating circuit 10 includes a mixing circuit 10a and an RF modulating circuit 10b. In the case where this invention is applied to a commercial video game apparatus, the RF modulating circuit 10b is unnecessary.

Connected to the CPU 1 through a data bus and an address bus are the I/O interface 5, program ROM 6, working RAM 7 and video RAM 8. A detection signal and a trigger signal from the pistol 4 will be imparted to the I/O interface 5.

A light receiving circuit as shown in FIG. 2 is built in the pistol 4. The light receiving circuit comprises a phototransistor 41, a transistor 42 forming an amplifying circuit, a capacitor 45 and a coil 46 which form a filter, a NAND gate 43 forming a waveform shaping circuit, and a switch 44 for producing a trigger signal when the trigger on the pistol is pulled. The phototransistor 41 serves to detect the light from a target on the television screen to convert it to an electric signal, the output from said phototransistor 41 being amplified by the transistor 42, and only the detection signal which corresponds to the horizontal oscillation frequency in the television synchronizing signal is extracted by the filter formed of the capacitor 45 and coil 46, the other frequency components being attenuated. Therefore, the detection signal passing through the filter circuit has a frequency characteristic shown in FIG. 3. And the detection signal is modified in waveform by the NAND gate 43 to provide a pulse signal, which is then imparted as a detection signal to the aforesaid I/O interface 5. Further, when the trigger on the pistol 4 is pulled, the switch 44 is closed to impart a trigger signal to the I/O interface 5.

Referring again to FIG. 1, the program ROM 6 serves to store all the program necessary for the CPU 1 to do the processing for a television game and it includes, for example as shown in FIG. 4, a storing region 61 for storing various instructions, a storing region 62 for storing picture data in the game, and storing regions 63 through 65 for storing 3 pieces of white picture data for turning 3 targets into white mock target, picture in the case where one picture has 3 targets. Thus, if target positions are set at upper left, upper right and lower left on the television screen, white picture data a, b and c are stored correspondingly thereto. Each white picture data is stored using 4 bytes to represent start and end addresses in the horizontal direction of the white picture to be displayed and start and end addresses in the vertical direction. In addition, the reason why a mock target is shown by a white picture is that when the light receiving circuit shown in FIG. 2 detects the light from the television screen, the highest efficiency can be attained by detecting a white picture.

The working RAM 7 shown in FIG. 1 includes storing regions 71 through 79, as shown in FIG. 5. The storing regions 71 is used as a register, the storing region 72 as a counter, the storing region 73 as a program counter, and the storing region 74 is used as a pointer. Further, the storing region 75 is used to store a blank-on flag, the storing region 76 a trigger flag, the storing region 77 an NMI flag, the storing region 78 a miss flag, and the storing region 79 is used to store a hit flag.

The RAM 8 has storing regions corresponding to picture elements on the television screen, and white picture data a through c shown in FIG. 4 are written thereto. The data written to the video RAM 8 are read on instruction from the CPU 1 and imparted to the character ROM 9. The character ROM 9 is used to store therein in advance targets, backgrounds and other characters which appear on the television. Data in the character ROM 9 is read on instructions from the CPU 1; thus, together with any of the white picture data a through b read from the video RAM 8, targets, backgrounds and other characters are read and imparted to the video signal generating circuit 10. The video signal generating circuit 10 converts a signal read from the character ROM 9 to a television signal on the basis of horizontal and vertical synchronizing signals delivered from the synchronizing signal generator 3 and imparts it to the television monitor 11.

Figure 6:
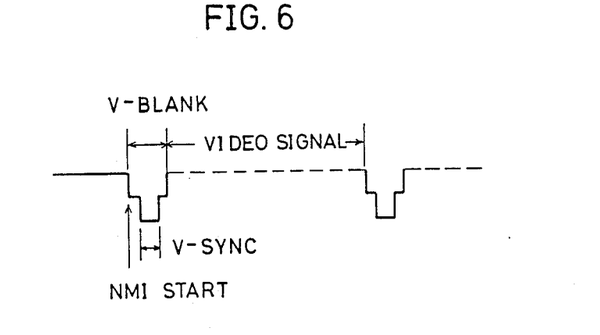
FIG. 6 is a waveform diagram of a television synchronizing signal.
Figure 7:
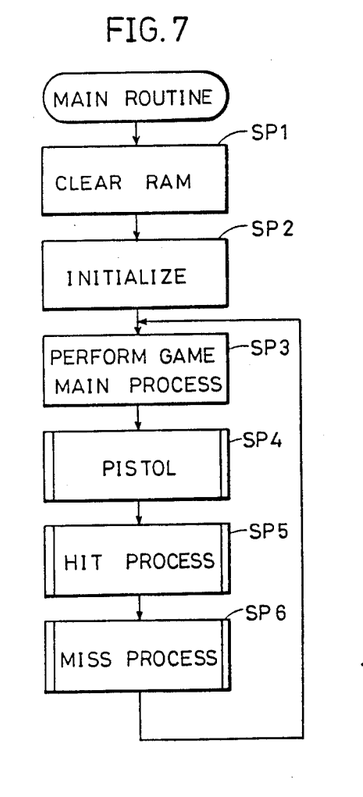
FIG. 7 is a flow chart, particularly a main routine, for explaining the operation of an embodiment of this invention.
Figure 8:
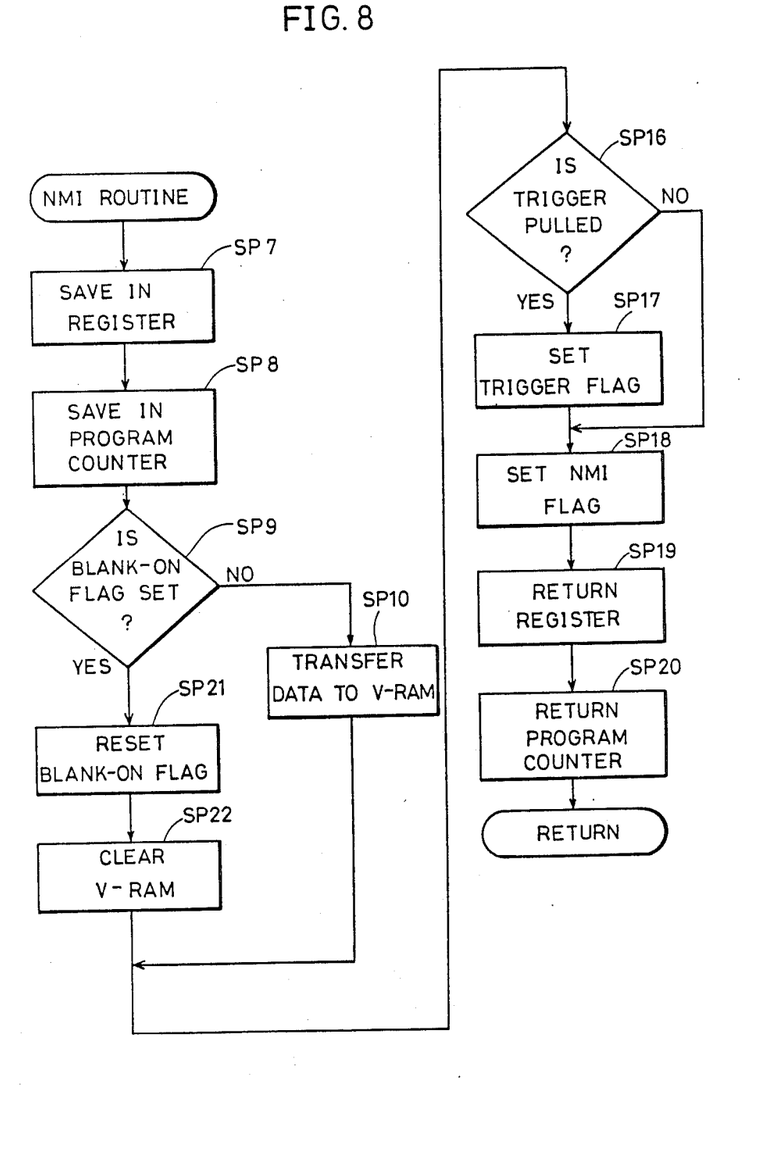
FIG. 8 is a diagram showing an NMI routine.
Figure 9:
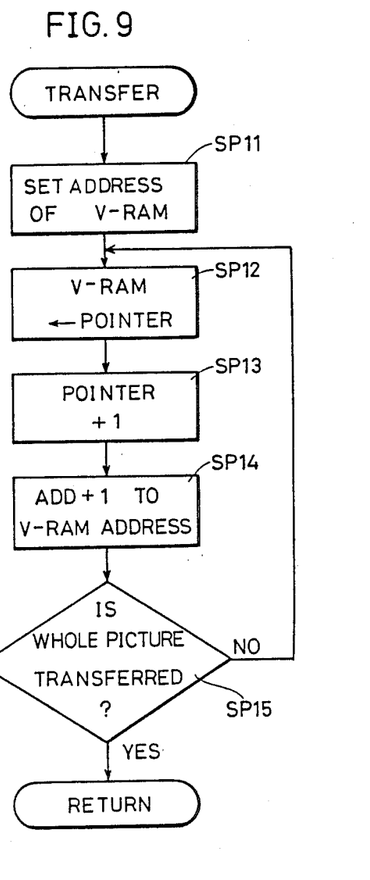
FIG. 9 is a diagram showing a transfer routine.
Figure 10A:
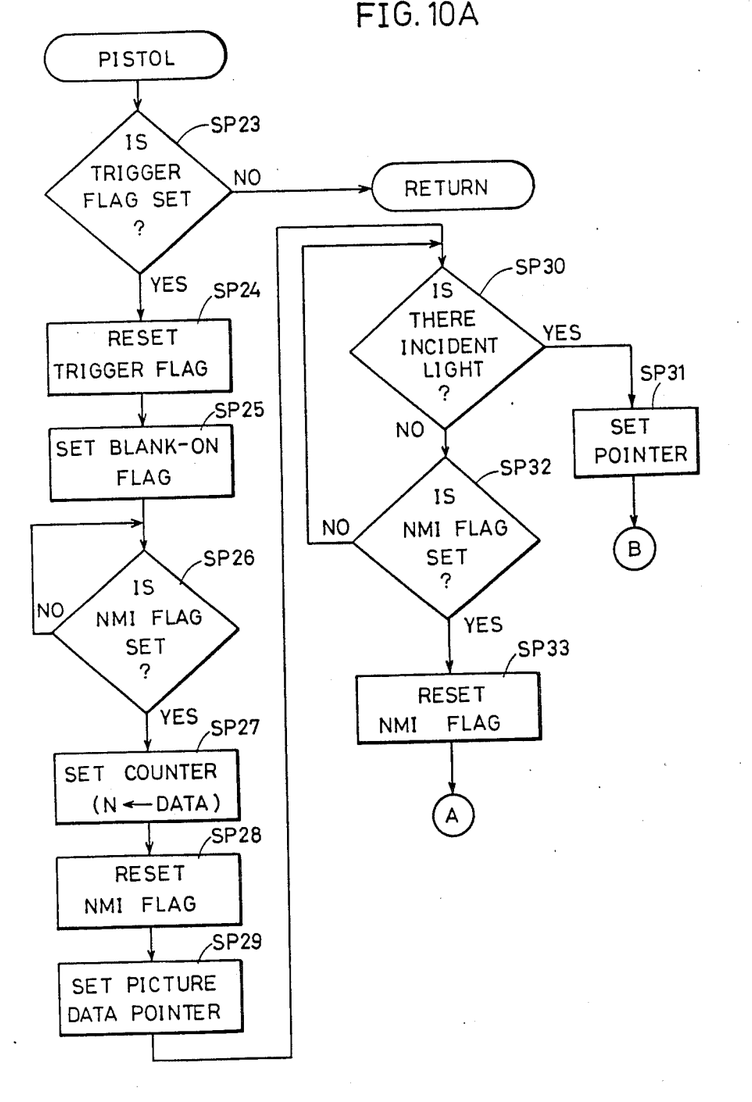
FIGS. 10A and 10B are diagrams showing a pistol process routine.
Figure 10B:
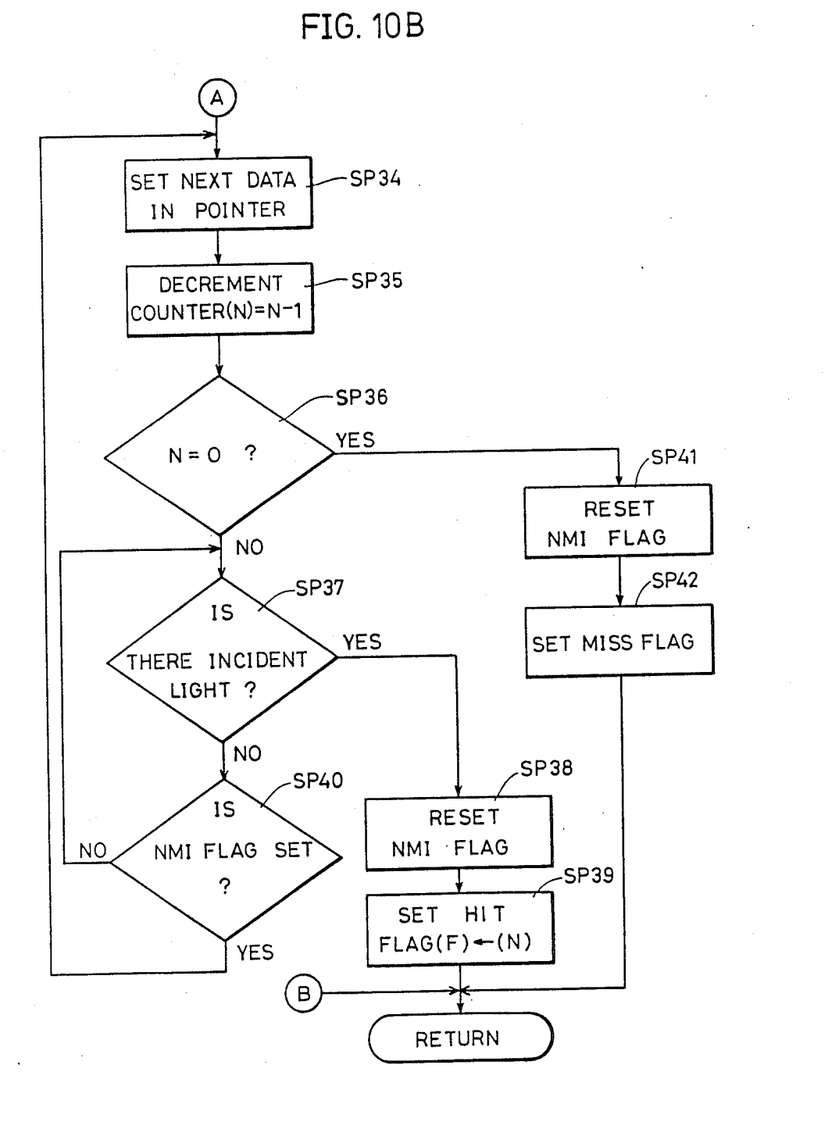

FIG. 6 is a waveform diagram of a television synchronizing signal, and FIGS. 7 through 10B are flow charts for explaining an embodiment of this invention. FIG. 7 shows a main routine; FIG. 8 shows an NMI routine; FIG. 9 shows a transfer routine; and FIGS. 10A and 10B show a pistol routine.

Referring to FIGS. 1 through 10B, the operation of an embodiment of the invention will now be described. First, when the power is turned on, the CPU 1 proceeds to the main routine shown in FIG. 7. At step (abbreviated to SP in the figures) SP 1, the video RAM 8 is cleared and at step SP 2 the registers in the CPU 1 are initialized. That is, the predetermined data preceding the start of the game is written to the RAMs 7 and 8. At step SP 3, the main process for displaying the contents of the game including the title on the television monitor 11 is performed. At step SP 4, the pistol process routine shown in FIG. 9 is executed and at step SP 5 the hit process associated with hitting the target is performed, while at step SP 6 the miss-processing associated with missing the target is performed.

This will now be described in more detail. When the CPU 1 receives a vertical synchronizing signal from the synchronizing signal generator 3, it executes the NMI routine shown in FIG. 8 with the timing of the front edge in a vertical blanking period (V-BLANK) shown in FIG. 6. That is, in order that the CPU 1 may return to the process just prior to entering the NMI routine after it has executed the NMI routine by interruption, the CPU 1 saves the preceding data in the register 71 at step SP 7 and saves the preceding address in the program counter 73 at step SP 8. At step SP 9, it decides whether or not the blank-on flag 75 is set. In the initial state, the blank-on flag 75 is not set, so that the CPU 1 goes to step SP 10, entering the routine for transferring data to the video RAM 8 in FIG. 9.

At step SP 11 of the transfer routine shown in FIG. 9, the CPU 1 designates the address of the video RAM 8. At step SP 12, it transfers to the video RAM 8 the first data included in the white picture data a in the storing region 63 designated by the pointer 74 in the program data described above with reference to FIG. 4. Subsequently, at step SP 13, it adds +1 to the pointer 74 and at step SP 14 it adds +1 to the address of the video RAM 8. At step SP 15 it decides whether or not all the white picture data stored in the storing region 63 of the program ROM 6 has been transferred. If it has not been transferred, the CPU 1 transfers the next data in the storing region 63 designated by the pointer 74 to the video RAM 8. Repeating this operation, it transfers all the white picture data stored in the storing region 63 of the program ROM 6 to the video RAM 8, proceeding again to the NMI routine 1 shown in FIG. 8.

The NMI routine is interruptable without being limited by the program; it can be interrupted once for each frame, that is, it can be interrupted once during the time between two successive vertical blanking signals.

In the NMI routine, at step SP 16 the CPU 1 decides whether or not a trigger signal resulting from pulling the trigger has been inputted from the pistol 4 through the I/O interface 5. If it has not been inputted, the CPU 1, at step SP 18, sets the NMI flag 77. If it has been inputted, the CPU 1, at step SP 17, sets the trigger flag 76 and then it sets the NMI flag 77. At step SP 19, the CPU 1 returns the register and at step SP 20 it returns the program counter 73, returning to the main routine shown in FIG. 7.

In the main routine, the CPU 1 goes to the pistol process routine shown in FIGS. 10A and 10B on the basis of a trigger signal being inputted by the closing of the switch 44 caused by pulling the trigger on the pistol 4, because of the necessity of detecting the light from the television monitor 11 with that timing. In the pistol process routine, at step SP 23 the CPU 1 decides whether or not the trigger flag 76 has been set. If it has not been set, the CPU 1 goes to the main routine to perform the hit process. If the trigger flag has been set, the CPU 1, at step SP 24, resets the trigger flag 76 and at step SP 25 it sets the blank-on flag 75 for remembering to shift the screen of the television monitor 11 to a black picture. Subsequently, at step SP 26, it decides whether or not the NMI flag has been set, so as to detect the start of the vertical blanking period. After this detection, a black picture corresponding to 1 frame in the television monitor 11 starts to appear.

At step SP 27, the number of targets which appear in 1 picture, "3" in this embodiment, is set in the counter 72. Thereafter, at step SP 28 the CPU 1 resets the aforesaid NMI flag 77 and at step SP 29 it sets the next picture data in the pointer 74. That is, during the time the screen of the television monitor 11 is presenting a black picture, preparations for transferring the next white picture data are made. At step SP 30, it decides whether or not a detection signal from the pistol 4 has been inputted. At this point of time, the television monitor 11 is displaying a black picture, and there is no possibility of the phototransistor 41 detecting the light from the television monitor 11; thus, if incident light is detected, the CPU 1, regarding said incident light as a noise, resets the pointer 74 at step SP 31, and proceeds to RETURN so as to restore the original picture data of the game and does not perform the white picture display and hit operation of steps SP 32 through SP 42 If no incident light is detected at step SP 30, whether or not the NMI flag 77 has been set is decided at step SP 32. If it has not been set, the CPU 1 returns to the aforesaid step SP 30. That is, after displaying a black picture corresponding to 1 frame on the television monitor 11, the CPU 1, at steps SP 30 and SP 32, waits until it detects the next vertical blanking period.

When the vertical blanking period in the next frame comes on after a black picture corresponding to 1 frame has been displayed on the television monitor 11, the NMI flag 77 is set at step SP 18 of the NMI routine shown in FIG. 7, with the television monitor 11 having the target at upper left turned to a white picture A on the basis of the white data a. At step SP 33, the CPU 1 resets the NMI flag 77 and at step SP 34 it sets the next data in the pointer 74. That is, in the case where there are a plurality of targets, the next white picture data b is set in the pointer 74. At step SP 35, it decrements the counter 72 which counts the number of targets and at step SP 36 it decides whether or not the process for displaying 3 targets has been completed, on the basis of whether or not the count on the counter 72 is 0. If the count is not "0", whether or not a trigger signal has been inputted from the pistol 4 is decided at step SP 37. If it has been inputted, the white picture A will be displayed in the target display position at upper left of the television monitor 11 and/or around the periphery thereof on the basis of the white picture data a subsequently to the display of a black picture on the television monitor 11, with the CPU 1 deciding that it is an incident light signal from the white picture A corresponding to this target. At step SP 38, the CPU 1 resets the NMI flag 77 and at step SP 39 it sets the hit flag 79. The hit flag 79 serves to indicate which of the targets is hit, thus enabling the CPU 1 to decide which of the targets is hit. After setting the hit flag 79, the CPU 1 goes again to the main routine shown in FIG. 7, and at step SP 5 it performs the process associated with hitting a target, that is, the hit process.

In addition, at the aforesaid step SP 37, if the phototransistor 41 in the pistol 4 has detected no light from a target on the basis of the white picture data a, then at step SP 40, the CPU 1 decides whether or not the NMI flag 77 has been set. If the NMI flag 77 has not been set, the CPU 1 returns to step SP 37. The white picture A corresponding to the target is displayed and it is decided whether or not there is incident light during 1 frame period. In the absence of incident light during 1 frame period, if the CPU 1, at step SP 40, decides that the NMI flag 77 has been set, that is, if it decides that the next frame has just started, it returns to step SP 34, entering into the operation for displaying a white picture B on the basis of the next white picture data b.- It displays the white picture B at upper right of the television screen and sets the hit flag 79, performing the hit process for increasing the player's score. If no light is detected, the miss process will be performed.

The same operation is repeated as to the white picture data c; at step SP 34, data is set in the pointer 74, at step SP 35, the counter 72 is decremented, at step SP 36, it is decided that the count on the counter 72 is "0" and then the CPU 1 goes to step SP 41. At step SP 41, it resets the NMI flag 77 and at step SP 41 it sets the miss flag 78. That is, white pictures A through C based on the white picture data a through c are displayed at upper left, upper right and lower left of the screen. Only when none of the targets are hit, the CPU 1 sets the miss flag 78 and then returns to the main routine so as to perform the miss process.

As has been described so far, according to this embodiment, an image serving as a background picture together with targets is displayed on the screen of the television monitor 11, and when the trigger on the pistol 4 is pulled, a black picture is displayed around the periphery of the target in the next frame, and a white picture is displayed in the position where the target was displayed just before and/or around the periphery thereof (that is, in an area somewhat larger than the target) in the third frame. The light from the white picture can be detected by the phototransistor 41. Therefore, even if a background picture in addition to a target is displayed on the same screen, it is possible to avoid mistaking for the target the white picture corresponding to the background picture except around the periphery of the target. In this case, since the black and white pictures displayed around the periphery of the target are shifted from one to the other in a very short time, only the target and the background picture are visible, so that there is no risk of losing the interest in the game.

In the above embodiment, in the case where two targets, for example, are to be displayed, first, a target and a background picture are displayed and when the trigger on the pistol 4 is pulled, the whole picture is turned to a black picture in the next frame, a white picture is displayed around the periphery of the first target in the third frame, a black picture is displayed again in the fourth frame, a white picture is displayed around the second target in the fifth frame.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus using television video to display images on a video screen for simulated game play and target practice, comprising:
   target signal generating means (9) for generating a signal or displaying a target at a location on a video screen,
   trigger signal generating means (44) for generating a trigger signal in response to a manual operation.
   photoelectric light detecting means (41) for detecting light from the video screen in response to the trigger signal from said trigger signal generating means,
   black picture displaying means (6,8,10) for displaying a black picture for a predetermined period on said television screen in response to the trigger signal from said trigger signal generating means,
   spurious light determining means for determining whether said photoelectric light detecting means detects light during said predetermined period that said black picture is displayed,
   white picture displaying means (6,8,10) for displaying a white target area after said spurious light determining means determines that no light has been detected during said black picture on said video screen for a predetermined period, said white target area being placed substantially at the location where the target was displayed, and
   signal extracting means (43) for extracting a target detection signal form said photoelectric light detecting means when detecting light from the white target area displayed on said video screen, after lapse of said predetermined black picture displaying period.

2. A video target control and sensing system for a photosensitive gun employed with a television or video monitor having a screen to play shooting games or to practice shooting, comprising:
   target signal generating means for generating a signal for displaying a target on the screen;
   a gun is used in a position remote;
   trigger signal generating means in said gun for generating a trigger signal in response to manual operation of a player;
   photoelectric light detecting means in said gun for detecting light from the screen and, when present, from spurious light, in response to the trigger signal form said trigger signal generating means, and for producing an electrical signal in response thereto;
   filter means for extracting said electrical signal from said photoelectric light detecting means at a frequency of a video synchronizing signal;
   black picture displaying control means for displaying a black picture on the entire screen for a predetermined short period synchronized with a frame interval in response to the trigger signal from said trigger signal generating means;
   spurious light detecting means for detecting whether or not an electrical signal is produced at an output of said filter means caused by the detection by said photoelectric light detecting means of the spurious light, when present, while the black picture is being displayed on the entire screen;
   mock target displaying control means for displaying a white mock target in place of said black picture for predetermined short period synchronized with said frame interval and positioned on the screen substantially where the target had been displayed by said target signal generating means, and only when said spurious light detecting means fails to detects spurious light; and
   hit detecting means for detecting a hit at a target location in response to an electrical signal produced at an output from said filter means during the period of displaying said white mock target on the screen substantially where the target had been displayed.

3. A system as set forth in claim 2, wherein:
   said target signal generating means comprises means for generating signals for successively displaying targets in a plurality of different positions on the screen;
   said white mock target picture displaying control means comprises:
   data storing means for storing position data corresponding to said plurality of different positions, and
   means for sequentially reading from said data storing means data for the next target position that is to be displayed each time said hit detection means detects a hit at a target location in response to the display of said white mock target.

4. A system as set forth in claim 2, wherein:
   said black picture displaying control means comprises means for rewriting display data during a vertical blanking period of a video synchronizing signal for displaying a black picture on the entire screen in the frame that follows the vertical blanking period.

5. A system as set forth in claim 2, wherein:
   said mock target displaying control means comprises means for rewriting display data during the vertical blanking period of a video synchronizing signal for displaying a white mock target in the frame that follows the vertical blanking period.

6. The system of claim 2, wherein said filter means comprises means extracting said electrical signal a the horizontal synchronizing frequency of the video signal.

7. A video target and sensing system for a photosensitive gun employed with a television or video monitor to display and shoot targets on a video screen, comprising:
- storage means for storing target data for displaying a target at a position on the video screen, black picture data for displaying a black picture on the entire video screen, white picture data for displaying a white mock target on the video screen substantially at the position where the target has been displayed, said program data for controlling the display operations;
- processing means for processing data in response to the program data in said storage means to control the display on said video screen;
- a gun,
- a trigger signal generating means in said gun for generating a trigger signal in response to a manual operation of a player,
- photoelectric light detecting means in said gun for detecting light from the video screen when said gun is directed toward the video screen; and
- filter means for extracting an electrical signal from said photoelectric light detecting means at a frequency of a television synchronizing signal, said processing means further comprising:
- target displaying means for displaying a target at a desired position on the video screen in response to the target data in said storage means,
- black picture displaying means for displaying a black picture on the entire video screen in the frame following that frame in which the trigger signal is generated by said trigger signal generating means and also in response to the black picture data stored in said storage means,
- spurious light determining means for determining whether or not an electrical signal is produced at an output of said filter means while said black picture is being displayed on the entire video screen,
- mock target displaying means responsive to the white picture data stored in said storage means for displaying a white mock target on the video screen substantially at the position that said target has been displayed, said mock target displaying means being operative only after said spurious light determining means determines that no electrical signal is produced by said filter means while said black picture is being displayed on the entire video screen, and
- hit determining means for determining a hit of a target when an electrical signal is produced at an output of said filter means during a frame period in which a white mock target is being displayed on the video screen.

8. The system as set forth in claim 7, wherein:
said storage means includes means for storing multiple target data for displaying targets in a plurality of different target positions and white picture data for displaying white mock targets in screen areas corresponding to different target displaying positions, and
said processing means comprises sequencing means responsive to said hit determining means for reading target data from said storage means for each of said plurality of different target positions in succession for causing target data for a different target position to be read each time a hit of a target is determined.

* * * * *